US009966062B2

United States Patent
Gunn et al.

(10) Patent No.: US 9,966,062 B2
(45) Date of Patent: *May 8, 2018

(54) METHOD AND DEVICE FOR VOICE RECOGNITION TRAINING

(71) Applicant: Google Technology Holdings LLC, Mountain View, CA (US)

(72) Inventors: Michael E. Gunn, Barrington, IL (US); Boris Bekkerman, Highwood, IL (US); Mark A. Jasiuk, Chicago, IL (US); Pratik M. Kamdar, Gurnee, IL (US); Jeffrey A. Sierawski, Wauconda, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/466,448

(22) Filed: Mar. 22, 2017

(65) Prior Publication Data
US 2017/0193985 A1 Jul. 6, 2017

Related U.S. Application Data

(63) Continuation of application No. 14/142,210, filed on Dec. 27, 2013.

(60) Provisional application No. 61/892,527, filed on Oct. 18, 2013, provisional application No. 61/857,696, filed on Jul. 23, 2013.

(51) Int. Cl.
*G10L 15/22* (2006.01)
*G10L 15/20* (2006.01)
*G10L 15/06* (2013.01)
*G06F 3/0484* (2013.01)

(52) U.S. Cl.
CPC ........ *G10L 15/063* (2013.01); *G06F 3/04842* (2013.01); *G10L 15/20* (2013.01); *G10L 2015/0638* (2013.01)

(58) Field of Classification Search
CPC ........ G10L 15/20; G10L 15/22; G10L 15/26; G10L 15/063; H04M 2201/40
See application file for complete search history.

(56) References Cited

U.S. PATENT DOCUMENTS 4,348,550 A 9/1982 Pirz et al.
4,363,102 A 12/1982 Holmgren et al.
(Continued)

OTHER PUBLICATIONS

Sound Meter—Android Apps on Google Play, https://play.google.com/store/apps/details?id=kr.sira.sound, Jul. 27, 2013, all pages.
(Continued)

*Primary Examiner* — Jialong He
(74) *Attorney, Agent, or Firm* — Fish & Richardson P.C.

(57) ABSTRACT

A method on a mobile device for voice recognition training is described. A voice training mode is entered. A voice training sample for a user of the mobile device is recorded. The voice training mode is interrupted to enter a noise indicator mode based on a sample background noise level for the voice training sample and a sample background noise type for the voice training sample. The voice training mode is returned to from the noise indicator mode when the user provides a continuation input that indicates a current background noise level meets an indicator threshold value.

18 Claims, 5 Drawing Sheets

(56) References Cited

U.S. PATENT DOCUMENTS

| | | |
|---|---|---|
| 4,656,651 A | 4/1987 | Evans et al. |
| 4,763,350 A | 8/1988 | Immendorfer et al. |
| 4,785,408 A | 11/1988 | Britton et al. |
| 4,805,212 A | 2/1989 | Hase et al. |
| 4,827,500 A | 5/1989 | Binkerd et al. |
| 4,827,518 A | 5/1989 | Feustel et al. |
| 4,837,804 A | 6/1989 | Akita |
| 4,876,717 A | 10/1989 | Barron et al. |
| 4,914,692 A | 4/1990 | Hartwell et al. |
| 4,979,206 A | 12/1990 | Padden et al. |
| 5,033,088 A | 7/1991 | Shipman |
| 5,125,024 A | 6/1992 | Gokeen et al. |
| 5,127,043 A | 6/1992 | Hunt et al. |
| 5,136,631 A | 8/1992 | Einhorn et al. |
| 5,165,095 A | 11/1992 | Boreherding |
| 5,181,237 A | 1/1993 | Dowden et al. |
| 5,193,110 A | 3/1993 | Jones et al. |
| 5,199,062 A | 3/1993 | Von Meister et al. |
| 5,204,894 A | 4/1993 | Darden |
| 5,208,848 A | 5/1993 | Pula |
| 5,274,695 A | 12/1993 | Green |
| 5,297,183 A | 3/1994 | Bareis et al. |
| 5,297,194 A | 3/1994 | Hunt et al. |
| 5,301,227 A | 4/1994 | Kamei et al. |
| 5,353,336 A | 10/1994 | Hou et al. |
| 5,369,685 A | 11/1994 | Kero |
| 5,452,340 A | 9/1995 | Engelbeck et al. |
| 5,479,489 A | 12/1995 | O'Brien |
| 5,479,491 A | 12/1995 | Herrero-Garcia et al. |
| 5,517,566 A | 5/1996 | Smith et al. |
| 5,652,789 A | 7/1997 | Miner et al. |
| 5,717,738 A | 2/1998 | Gammel |
| 5,719,921 A | 2/1998 | Vysotsky et al. |
| 5,799,273 A | 8/1998 | Mitchell et al. |
| 5,805,672 A | 9/1998 | Barkat et al. |
| 5,832,063 A | 11/1998 | Vysotsky et al. |
| 5,893,059 A | 4/1999 | Raman |
| 5,912,949 A | 6/1999 | Chan et al. |
| 5,915,001 A | 6/1999 | Uppaluru |
| 5,949,886 A | 9/1999 | Nevins et al. |
| 5,953,700 A | 9/1999 | Kanesky et al. |
| 5,956,683 A | 9/1999 | Jacobs et al. |
| 5,960,399 A | 9/1999 | Barclay et al. |
| 5,970,446 A | 10/1999 | Goldberg et al. |
| 5,974,382 A * | 10/1999 | Fado ............... G06F 3/165 704/270 |
| 5,995,826 A | 11/1999 | Cox et al. |
| 6,012,030 A | 1/2000 | French-St. George |
| 6,016,336 A | 1/2000 | Hanson |
| 6,021,181 A | 2/2000 | Miner et al. |
| 6,094,476 A | 7/2000 | Hunt et al. |
| 6,118,866 A | 9/2000 | Shtivelman |
| 6,144,667 A | 11/2000 | Doshi et al. |
| 6,144,938 A | 11/2000 | Surace et al. |
| 6,157,705 A | 12/2000 | Perrone |
| 6,167,117 A | 12/2000 | Will |
| 6,167,118 A | 12/2000 | Slivensky |
| 6,185,535 B1 | 2/2001 | Hedin et al. |
| 6,212,408 B1 | 4/2001 | Son et al. |
| 6,259,772 B1 | 7/2001 | Stephens et al. |
| 6,259,786 B1 | 7/2001 | Gisby |
| 6,260,012 B1 | 7/2001 | Park |
| 6,275,805 B1 | 8/2001 | Fado et al. |
| 6,282,511 B1 | 8/2001 | Mayer |
| 6,323,306 B1 | 11/2001 | Song et al. |
| 6,324,499 B1 * | 11/2001 | Lewis ............... G10L 15/26 704/233 |
| 6,327,343 B1 | 12/2001 | Epstein et al. |
| 6,336,091 B1 | 1/2002 | Polikaitis et al. |
| 6,347,085 B2 | 2/2002 | Kelly |
| 6,363,348 B1 | 3/2002 | Besling et al. |
| 6,363,349 B1 | 3/2002 | Urs et al. |
| 6,366,886 B1 | 4/2002 | Dragosh et al. |
| 6,400,806 B1 | 6/2002 | Uppaluru |
| 6,404,876 B1 | 6/2002 | Smith et al. |
| 6,408,272 B1 | 6/2002 | White et al. |
| 6,442,519 B1 | 8/2002 | Kanevsky et al. |
| 6,449,496 B1 | 9/2002 | Beith et al. |
| 6,453,020 B1 | 9/2002 | Hughes et al. |
| 6,456,699 B1 | 9/2002 | Burg et al. |
| 6,463,413 B1 | 10/2002 | Appelbaum et al. |
| 6,487,534 B1 | 11/2002 | Thelen et al. |
| 6,493,433 B2 | 12/2002 | Clabaugh et al. |
| 6,493,673 B1 | 12/2002 | Ladd et al. |
| 6,501,832 B1 | 12/2002 | Saylor et al. |
| 6,507,643 B1 | 1/2003 | Groner |
| 6,574,599 B1 | 6/2003 | Lim et al. |
| 6,633,846 B1 | 10/2003 | Bennett et al. |
| 6,650,738 B1 | 11/2003 | Pershan et al. |
| 6,690,772 B1 | 2/2004 | Naik et al. |
| 6,693,893 B1 | 2/2004 | Ehlinger |
| 6,744,860 B1 | 6/2004 | Schrage |
| 6,744,861 B1 | 6/2004 | Pershan et al. |
| 6,772,117 B1 | 8/2004 | Laurila et al. |
| 6,791,529 B2 | 9/2004 | Shteyn |
| 6,792,083 B2 | 9/2004 | Dams et al. |
| 6,823,306 B2 | 11/2004 | Reding et al. |
| 6,898,566 B1 * | 5/2005 | Benyassine ............ G10L 19/22 704/207 |
| 6,915,262 B2 | 7/2005 | Reding et al. |
| 6,941,264 B2 | 9/2005 | Konopka et al. |
| 6,954,657 B2 | 10/2005 | Bork |
| 7,080,014 B2 | 7/2006 | Bush et al. |
| 7,448,552 B2 * | 11/2008 | Grupp ................... G04G 21/06 235/472.01 |
| 7,822,613 B2 | 10/2010 | Matsubara et al. |
| 7,826,945 B2 | 11/2010 | Zhang et al. |
| 8,212,922 B2 * | 7/2012 | Momosaki ............ H04N 5/445 348/468 |
| 8,438,023 B1 | 5/2013 | Hamilton et al. |
| 2002/0059066 A1 | 5/2002 | O'Hagan |
| 2002/0065657 A1 | 5/2002 | Reding et al. |
| 2003/0189586 A1 * | 10/2003 | Vronay ................. G06F 3/0481 715/700 |
| 2004/0176953 A1 | 9/2004 | Coyle et al. |
| 2004/0260547 A1 | 12/2004 | Cohen et al. |
| 2005/0171664 A1 | 8/2005 | Konig |
| 2008/0071540 A1 | 3/2008 | Nakano et al. |
| 2009/0103739 A1 | 4/2009 | Strait |
| 2009/0187402 A1 | 7/2009 | Scholl |
| 2012/0089392 A1 | 4/2012 | Larco et al. |
| 2013/0002531 A1 * | 1/2013 | Krahenbuhl .......... G06F 3/0416 345/156 |
| 2013/0185066 A1 | 7/2013 | Tzirkel-Hancock et al. |
| 2013/0211832 A1 | 8/2013 | Talwar et al. |
| 2013/0278824 A1 | 10/2013 | Eirarsson |
| 2013/0279705 A1 * | 10/2013 | Wong ................... G01S 3/8036 381/56 |
| 2013/0342171 A1 | 12/2013 | Grivas |

OTHER PUBLICATIONS

PeakDetector—LabWindows_CVI 2012 Help—National Instruments, http://zone.ni.com/reference/en-XX/ help/370051V-01/cvi/libref/cvipeakdetector/, Aug. 2012, all pages.

Office Action issued in U.S. Appl. No. 11/767,853 dated Aug. 14, 2012, 8 pages.

Office Action issued in U.S. Appl. No. 11/767,853 dated Feb. 28, 2011, 25 pages.

Notice of Allowance issued in U.S. Appl. No. 09/309,274 dated Apr. 6, 2007, 6 pages.

Office Action issued in U.S. Appl. No. 09/309,274 dated Nov. 29, 2006, 16 pages.

Office Action issued in U.S. Appl. No. 09/309,274 dated May 10, 2006, 17 pages.

Office Action issued in U.S. Appl. No. 09/309,274 dated Jun. 21, 2004, 15 pages.

Office Action issued in U.S. Appl. No. 09/309,274 dated Oct. 22, 2003, 17 pages.

Office Action issued in U.S. Appl. No. 09/309,274 dated Mar. 11, 2003, 17 pages.

(56) References Cited

OTHER PUBLICATIONS

Office Action issued in U.S. Appl. No. 09/309,274 dated Oct. 3, 2002, 17 pages.
Notice of Allowance issued in U.S. Appl. No. 11/767,853 dated Oct. 10, 2012, 6 pages.
Office Action issued in U.S. Appl. No. 13/611,989 dated May 2, 2013, 19 pages.
Notice of Allowance issued in U.S. Appl. No. 13/611,989 dated Jun. 24, 2013, 6 pages.
Office Action issued in U.S. Appl. No. 13/932,411 dated Sep. 27, 2013, 16 pages.
Office Action issued in U.S. Appl. No. 13/932,411 dated Jan. 6, 2014, 5 pages.
Office Action issued in U.S. Appl. No. 13/932,411 dated Jun. 30, 2014, 6 pages.
Office Action issued in U.S. Appl. No. 09/726,972 dated Apr. 9, 2003, 21 pages.
Office Action issued in U.S. Appl. No. 09/726,972 dated Dec. 19, 2003, 13 pages.
Office Action issued in U.S. Appl. No. 10/961,781 dated Nov. 28, 2006, 16 pages.
Office Action issued in U.S. Appl. No. 10/961,781 dated Jul. 23, 2007, 16 pages.
Office Action issued in U.S. Appl. No. 13/340,954 dated Feb. 28, 2012, 18 pages.
Office Action issued in U.S. Appl. No. 13/340,954 dated Jul. 3, 2012, 12 pages.
Office Action issued in U.S. Appl. No. 13/614,982 dated Dec. 21, 2012, 19 pages.
Notice of Allowance issued in U.S. Appl. No. 13/340,954 dated Jan. 28, 2013, 9 pages.
Notice of Allowance issued in U.S. Appl. No. 13/614,982 dated Apr. 26, 2013, 9 pages.
Office Action issued in U.S. Appl. No. 13/922,602 dated Oct. 24, 2013, 22 pages.
Office Action issued in U.S. Appl. No. 13/922,602 dated Apr. 4, 2014, 16 pages.
Notice of Allowance issued in U.S. Appl. No. 13/922,602 dated Jun. 18, 2014, 10 pages.
Dragon, "Dragon naturally speaking: Installation and User Guide", Ver. 12, retrieved online, published in 2012.
Android boy, "Sound meter manual", Ver. 1.5, retrieved online from Archive.org, Archived on Nov. 2011.

\* cited by examiner

METHOD AND DEVICE FOR VOICE RECOGNITION TRAINING

CROSS-REFERENCE TO RELATED APPLICATIONS

The present application is a continuation of U.S. application Ser. No. 14/142,210, filed Dec. 27, 2013, which claims the benefit of U.S. Provisional Patent Application No. 61/892,527, filed Oct. 18, 2013 and U.S. Provisional Patent Application No. 61/857,696, filed Jul. 23, 2013, the contents of all are hereby incorporated by reference herein.

TECHNICAL FIELD

The present disclosure relates to processing audio signals and, more particularly, to methods and devices for audio signals including voice or speech.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS, strictly by voice.

Speech recognition in such devices is far from perfect, however. When using a speech recognition-enabled device for the first time, the user may need to "train" the speech recognition software to recognize his or her voice. For voice training of a voice recognition system to be successful, the user should be in an environment that meets certain levels of criteria. For example, background noise levels during the recording of a voice training sample should be within an acceptable range.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
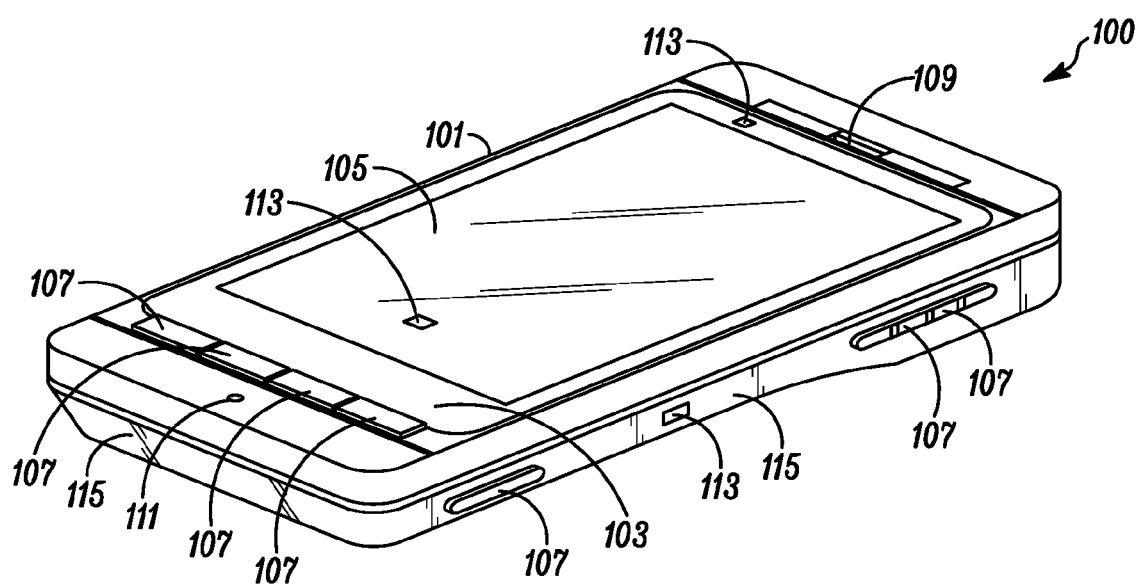
FIG. 1 is a block diagram illustrating a mobile device, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

When a user "trains" a voice or speech recognition system of a mobile device, the mobile device records a voice training sample. The mobile device analyzes the voice training sample for future verifications of a voice input from the user. Background noise present in the voice training sample increases a likelihood of error (e.g., false positive or false negative recognitions) for the future verifications. The mobile device determines a background noise level (e.g., in decibels) for the voice training sample and provides feedback to the user regarding the background noise. For example, where a voice training sample has background noise that exceeds a predetermined threshold, the mobile device may prompt the user for another voice training sample.

The mobile device also provides a visual indication of the current background noise levels relative to the predetermined threshold. The visual indication allows the user to move to a more suitable location for providing the voice training sample. In addition to determining the background noise level, the mobile device may also determine a background noise type for the voice training sample, such as stationary noise (e.g., road noise inside a moving car or fan noise from a nearby computer) or non-stationary noise (e.g., sound from a television or conversation). Non-stationary noise generally has a higher variance in signal level (e.g., signal peaks when speaking and signal valleys between sentences) than stationary noise. Accordingly, the mobile device may use different thresholds based on the background noise type.

The various embodiments described herein allow a mobile device to indicate noise levels for a voice training sample recorded during a voice training mode. If the background noise level exceeds an indicator threshold level, the mobile device interrupts the voice training mode and enters a noise indicator mode. This reduces the likelihood of recording another voice training sample with excessive background noise. While in the noise indicator mode, the mobile device displays a noise indicator interface with a noise indicator that corresponds to a current background noise level for a received audio input signal. The noise indicator has a disabled continuation indicator to prevent the user from proceeding to the voice training mode. When the current background noise level meets an indicator threshold value, the mobile device enables the continuation indicator allowing the user to proceed by providing a continuation input. If the continuation indicator is enabled, the mobile device returns to the voice training mode when the user provides the continuation input.

In one embodiment, the mobile device enters a voice training mode. The mobile device records a voice training sample for a user. The mobile device interrupts the voice training mode to enter a noise indicator mode based on a sample background noise level for the voice training sample and a sample background noise type for the voice training sample. The mobile device returns to the voice training mode from the noise indicator mode when the user provides a continuation input that indicates a current background noise level meets an indicator threshold value.

Referring to FIG. 1, there is illustrated a perspective view of an example mobile device 100. The mobile device 100 may be any type of device capable of storing and executing multiple applications. Examples of the mobile device 100 include, but are not limited to, mobile devices, smart phones, smart watches, wireless devices, tablet computing devices, personal digital assistants, personal navigation devices, touch screen input device, touch or pen-based input devices, portable video and/or audio players, and the like. It is to be understood that the mobile device 100 may take the form of a variety of form factors, such as, but not limited to, bar, tablet, flip/clam, slider, rotator, and wearable form factors.

For one embodiment, the mobile device 100 has a housing 101 comprising a front surface 103 which includes a visible display 105 and a user interface. For example, the user interface may be a touch screen including a touch-sensitive surface that overlays the display 105. For another embodiment, the user interface or touch screen of the mobile device 100 may include a touch-sensitive surface supported by the housing 101 that does not overlay any type of display. For yet another embodiment, the user interface of the mobile device 100 may include one or more input keys 107. Examples of the input key or keys 107 include, but are not limited to, keys of an alpha or numeric keypad or keyboard, a physical keys, touch-sensitive surfaces, mechanical surfaces, multipoint directional keys and side buttons or keys 107. The mobile device 100 may also comprise a speaker 109 and microphone 111 for audio output and input at the surface. It is to be understood that the mobile device 100 may include a variety of different combination of displays and interfaces.

The mobile device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. The sensor or sensors 113 may include an exterior sensor supported at the exterior boundary to detect an environmental condition associated with an environment external to the housing. The sensor or sensors 113 may also, or in the alternative, include an interior sensors supported within the exterior boundary (i.e., internal to the housing) to detect a condition of the device itself. Examples of the sensors 113 are described below in reference to FIG. 2.

Figure 2:
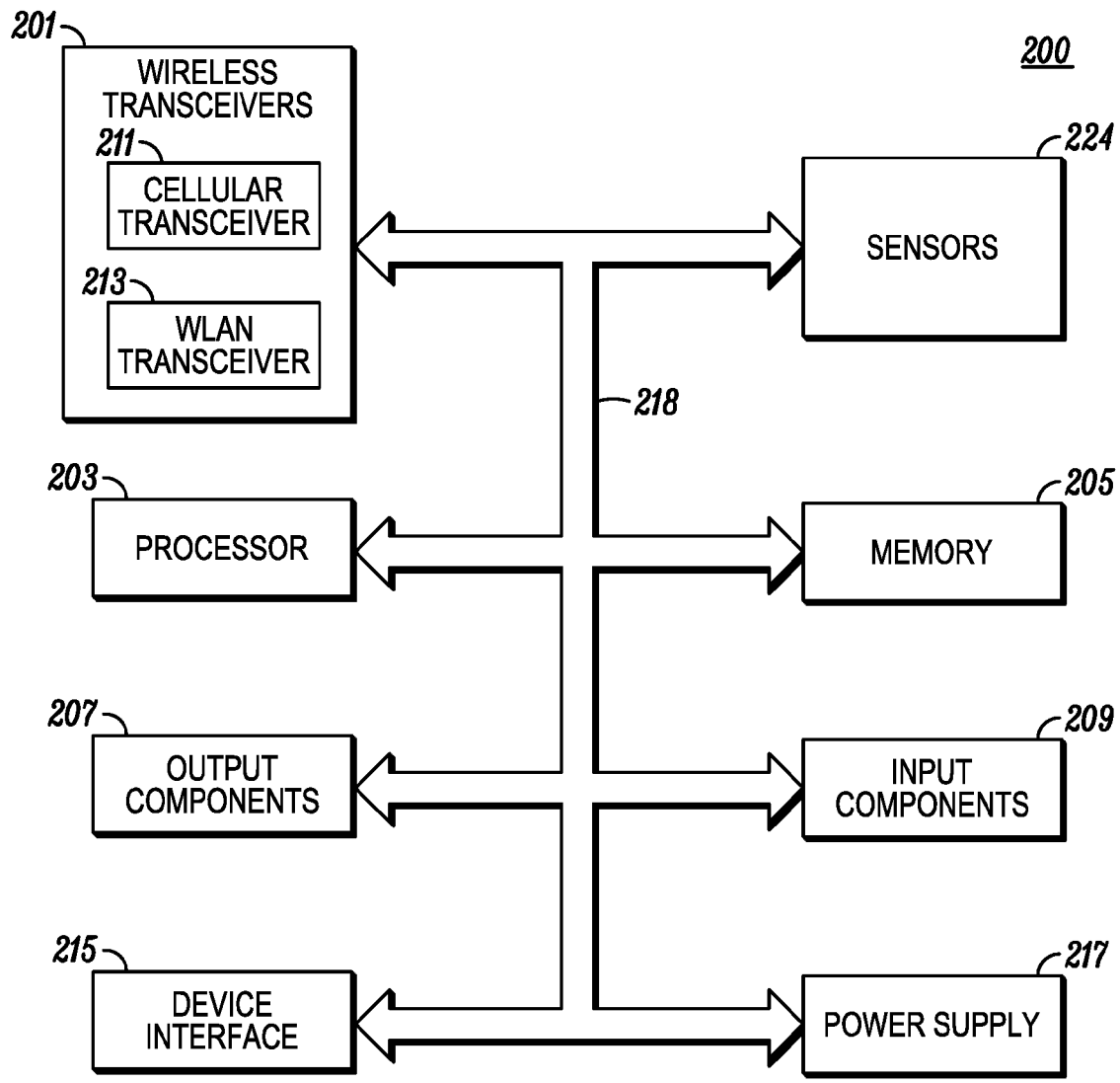
FIG. 2 is a block diagram of example components of a mobile device, according to an embodiment.

Referring to FIG. 2, there is shown a block diagram representing example components (e.g., internal components) 200 of the mobile device 100 of FIG. 1. In the present embodiment, the components 200 include one or more wireless transceivers 201, one or more processors 203, one or more memories 205, one or more output components 207, and one or more input components 209. As already noted above, the mobile device 100 includes a user interface, including the touch screen display 105 that comprises one or more of the output components 207 and one or more of the input components 209. Also as already discussed above, the mobile device 100 includes a plurality of the sensors 113, several of which are described in more detail below. In the present embodiment, the sensors 113 are in communication with (so as to provide sensor signals to or receive control signals from) a sensor hub 224.

Further, the components 200 include a device interface 215 to provide a direct connection to auxiliary components or accessories for additional or enhanced functionality. In addition, the internal components 200 include a power source or supply 217, such as a portable battery, for providing power to the other internal components and allow portability of the mobile device 100. As shown, all of the components 200, and particularly the wireless transceivers 201, processors 203, memories 205, output components 207, input components 209, sensor hub 224, device interface 215, and power supply 217, are coupled directly or indirectly with one another by way of one or more internal communication link(s) 218 (e.g., an internal communications bus).

Further, in the present embodiment of FIG. 2, the wireless transceivers 201 particularly include a cellular transceiver 211 and a Wi-Fi transceiver 213. Although in the present embodiment the wireless transceivers 201 particularly include two of the wireless transceivers 211 and 213, the present disclosure is intended to encompass numerous embodiments in which any arbitrary number of (e.g., more than two) wireless transceivers employing any arbitrary number of (e.g., two or more) communication technologies are present. More particularly, in the present embodiment, the cellular transceiver 211 is configured to conduct cellular communications, such as 3G, 4G, 4G-LTE, vis-à-vis cell towers (not shown), albeit in other embodiments, the cellular transceiver 211 can be configured to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 213 is a wireless local area network (WLAN) transceiver configured to conduct Wi-Fi communications in accordance with the IEEE 802.11 (a, b, g, or n) standard with access points. In other embodiments, the Wi-Fi transceiver 213 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 213 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Although in the present embodiment each of the wireless transceivers 201 serves as or includes both a respective transmitter and a respective receiver, it should be appreciated that the wireless transceivers are also intended to encompass one or more receiver(s) that are distinct from any transmitter(s), as well as one or more transmitter(s) that are distinct from any receiver(s). In one example embodiment encompassed herein, the wireless transceiver 201 includes at least one receiver that is a baseband receiver.

Exemplary operation of the wireless transceivers 201 in conjunction with others of the components 200 of the mobile device 100 can take a variety of forms and can include, for example, operation in which, upon reception of wireless signals (as provided, for example, by remote device(s)), the internal components detect communication signals and the transceivers 201 demodulate the communication signals to recover incoming information, such as voice or data, transmitted by the wireless signals. After receiving the incoming information from the transceivers 201, the processors 203 format the incoming information for the one or more output components 207. Likewise, for transmission of wireless signals, the processors 203 format outgoing information, which can but need not be activated by the input components 209, and convey the outgoing information to one or more of the wireless transceivers 201 for modulation so as to provide modulated communication signals to be transmitted. The wireless transceiver(s) 201 convey the modulated communication signals by way of wireless (as well as possibly wired) communication links to other devices (e.g., remote devices). The wireless transceivers 201 in one example allow the mobile device 100 to exchange messages with remote devices, for example, a remote network entity (not shown) of a cellular network or WLAN network. Examples of the remote network entity include an application server, web server, database server, or other network entity accessible through the wireless transceivers 201 either directly or indirectly via one or more intermediate devices or networks (e.g., via a WLAN access point, the Internet, LTE network, or other network).

Depending upon the embodiment, the output and input components 207, 209 of the components 200 can include a variety of visual, audio, or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm, or buzzer, or one or more mechanical output devices such as a vibrating mechanism or motion-based mechanism. Likewise, by example, the input device(s) 209 can include one or more visual input devices such as an optical sensor (for example, a camera lens and photosensor), one or more audio input devices such as a microphone, and one or more mechanical input devices such as a flip sensor, keyboard, keypad, selection button, navigation cluster, touch pad, capacitive sensor, motion sensor, and switch.

As already noted, the various sensors 113 in the present embodiment can be controlled by the sensor hub 224, which can operate in response to or independent of the processor(s) 203. Examples of the various sensors 113 may include, but are not limited to, power sensors, temperature sensors, pressure sensors, moisture sensors, ambient noise sensors, motion sensors (e.g., accelerometers or Gyro sensors), light sensors, proximity sensors (e.g., a light detecting sensor, an ultrasound transceiver or an infrared transceiver), other touch sensors, altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 100.

With respect to the processor(s) 203, the processor(s) can include any one or more processing or control devices such as, for example, a microprocessor, digital signal processor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the mobile device 100, such as interaction among the various components included among the components 200, communication with external devices or networks via the wireless transceivers 201 or the device interface 215, and storage and retrieval of applications and data, to and from the memories 205. Each application includes executable code that utilizes an operating system to provide more specific functionality, such as file system service and handling of protected and unprotected data stored in the memories 205. Such operating system or application information can include software update information (which can be understood to potentially encompass updates to either application(s) or operating system(s) or both). As for informational data, this is non-executable code or information that can be referenced or manipulated by an operating system or application for performing functions of the mobile device 100.

It is to be understood that FIG. 2 is provided for illustrative purposes only and for illustrating components of an mobile device in accordance with various embodiments, and is not intended to be a complete schematic diagram of the various components required for an mobile device. Therefore, an mobile device can include various other components not shown in FIG. 2, or can include a combination of two or more components or a division of a particular component into two or more separate components, and still be within the scope of the disclosed embodiments.

Figure 3:
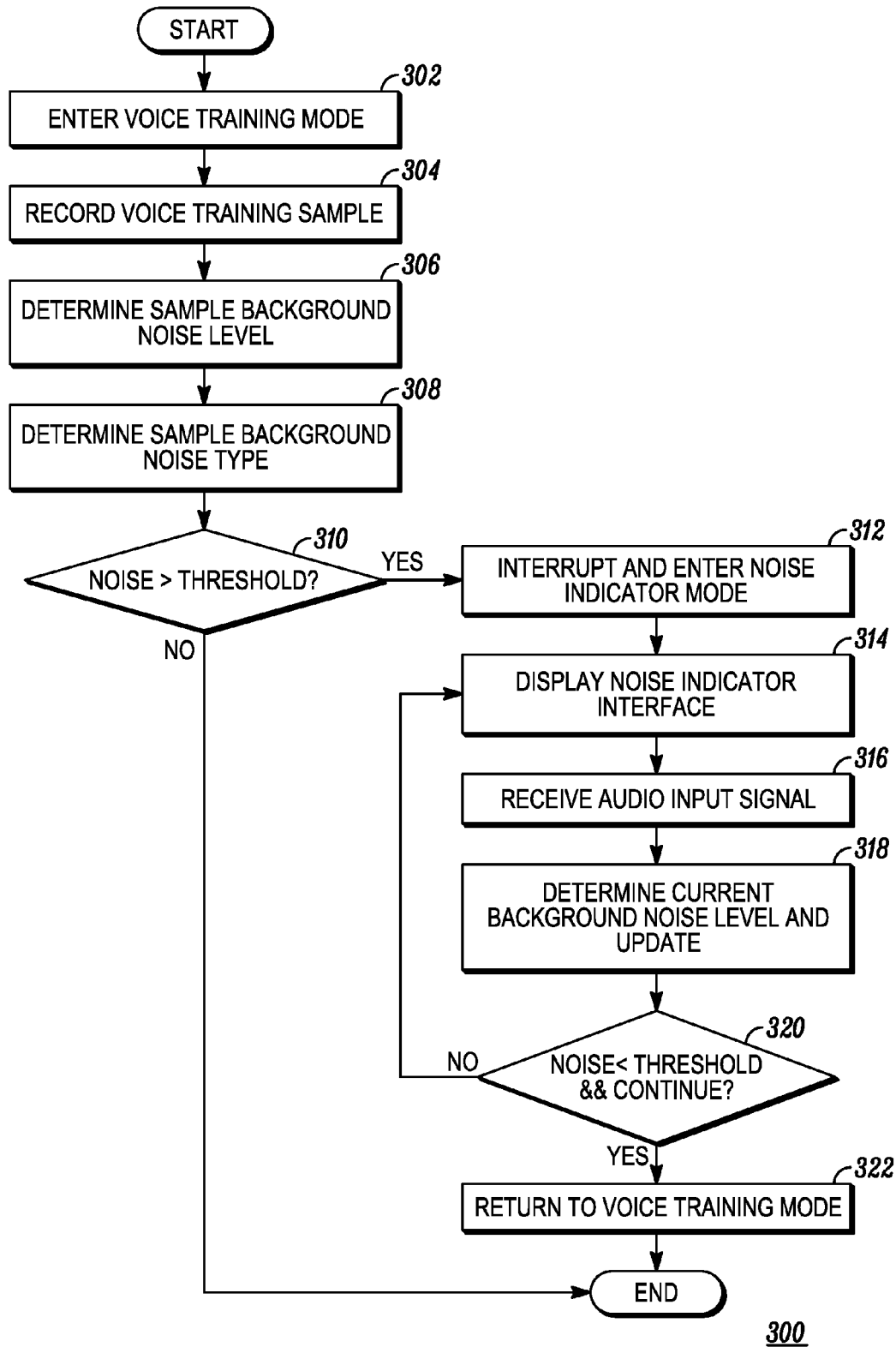
FIG. 3 illustrates a process flow of a method for voice training recognition that may be performed by the mobile device of FIG. 1, according to an embodiment.

Turning to FIG. 3, a process flow 300 illustrates a method for voice training recognition that may be performed by the mobile device 100, according to an embodiment. The mobile device 100 enters (302) a voice training mode. The voice training mode is a user interface or series of user interfaces of the mobile device 100 that allows the user to provide a voice training sample. During training, the user may follow a series of explanatory steps, where the user is informed about how to locate an environment that is conducive to voice training, which command he or she is to speak, and that he or she will be taken through multiple steps during the training process. For example, the mobile device 100 prompts the user to speak a trigger word, trigger phrase (e.g., "OK Google Now"), or other word(s) that provide a basis for voice recognition, as will be apparent to those skilled in the art. The mobile device 100 records (304) a voice training sample for the user.

The mobile device 100 determines (306) a sample background noise level for the voice training sample. The sample background noise level is an indicator of background noise within the voice training sample. In one example, the sample background noise level is a numeric indicator, such as a number of decibels of noise as an average power. In this case, the sample background noise level may be a decibel value with respect to an overload point for the microphone 111 (e.g., −60 dB or −40 dB). In another example, the sample background noise level is a tiered indicator, such as "High", "Medium", or "Low". Other indicators for the sample background noise level will be apparent to those skilled in the art. The mobile device 100 in one example determines the sample background noise level by analyzing the voice training sample with a valley signal detector. In another example, the mobile device 100 determines the sample background noise level by analyzing the voice training sample with a voice activity detector. For example, the mobile device 100 determines the sample background noise level for the voice training sample based on a signal level of a portion of the voice training sample that corresponds to a non-voice indication from the voice activity detector.

The mobile device 100 may perform additional processing on the voice training sample (or intermediate data based on the voice training sample) to determine the sample background noise level, such as averaging or smoothing. In one example, the mobile device 100 determines the sample background noise level based on a voice signal level for the voice training sample, for example, as a noise to signal ratio or noise to signal differential value. The mobile device 100 may determine the voice signal level with a peak signal detector or a voice activity detector.

The mobile device 100 also determines (308) a sample background noise type for the voice training sample. The sample background noise type is an indicator of other audio characteristics of the background noise, such as noise distribution, variance, or deviation. The mobile device 100 in example determines whether the sample background noise type is a stationary noise type (e.g., road noise inside a moving car or fan noise from a nearby computer) or non-stationary noise type (e.g., sound from a television or conversation). Non-stationary noise generally has a higher variance in signal level (e.g., signal peaks when speaking and signal valleys between sentences) than stationary noise. In other embodiments, the mobile device 100 may be configured to use other types of noise, as will be apparent to those skilled in the art.

Upon determination (306, 308) of the sample background noise level and type, the mobile device 100 determines (310) whether the sample background noise level has met (e.g., is less than or equal to) an indicator threshold value. The indicator threshold value is an indicator of quality for the voice training sample. The indicator threshold value in one example is a predetermined value, such as −40 dB. In another example, the mobile device 100 selects the indicator threshold value based on the sample background noise type. In this case, the mobile device 100 may select a lower indicator threshold value for a non-stationary noise type than for a stationary noise type. While the determination (310) is shown as being performed on a recorded voice training sample, in other implementations the mobile device 100 performs the determination (310) on an audio input signal (e.g., substantially in real-time).

If the sample background noise level meets the indicator threshold value (YES at 310), the process 300 ends (e.g., the mobile device 100 proceeds with the voice training). If the sample background noise level does not meet the indicator threshold value (NO at 310), the mobile device 100 interrupts (312) the voice training mode to enter a noise indicator mode based on the sample background noise level and the sample background noise type. During the noise indicator mode, the mobile device 100 displays (314) a noise indicator interface 400 (FIG. 4), for example, on the display 105. The noise indicator interface 400 indicates that the ambient or background noise is too high to continue, and that the user must move to a quieter location in order to continue. The mobile device 100 receives (316) an audio input signal (e.g., from the microphone 111) during the noise indicator mode. The mobile device 100 determines (318) a current background noise level for the audio input signal and updates the noise indicator interface 400, as described herein. In one example, the mobile device 100 updates the current background noise level substantially in real-time. The mobile device 100 may determine the current background noise level with one or more of the methods described above for determination (306) of the sample background noise level.

The mobile device 100 determines (320) whether a continuation input is received from the user while a continuation indicator 404 (FIG. 4) is enabled. The user provides the continuation input to indicate that they wish to proceed with the voice training mode (e.g., an interaction with a button or touch screen display, voice command, or other input). As described herein, the mobile device 100 enables or disables the continuation indicator 404 based on the current background noise level. In one example, the mobile device 100 disables the continuation indicator 404 to prevent the user from providing the continuation input. If the continuation input is received while the continuation indicator 404 is enabled, the mobile device 100 returns (322) to the voice training mode. The mobile device 100 stays in the noise indicator mode and displays (314) the noise indicator interface 400 until the continuation input is received while the continuation indicator 404 is enabled. In alternate implementations, the user may cancel the noise indicator mode by canceling the voice training mode (for example, to stop the voice training mode so that they may train at another time).

Turning to FIGS. 4A, 4B, 4C, and 4D, the noise indicator interface 400 is shown represented as views 410, 420, 430, and 440 taken at different times. The mobile device 100 displays (314) the noise indicator interface 400 during the noise indicator mode. In the examples shown in FIGS. 4A, 4B, 4C, and 4D, the noise indicator interface 400 includes a noise indicator 402, the continuation indicator 404, and optionally an information display 406.

The noise indicator 402 as shown in FIG. 4 is a dial-type indicator with a "needle" that corresponds to the current background noise level. The mobile device 100 in one example updates the needle as it determines the current background noise level. In this case, the noise indicator 402 may include one or more indicator thresholds, such as indicator thresholds 408 and 409. In one example, the noise indicator 402 indicates a range of values for the current background noise level, such as −60 dB to 0 dB. In this case, the indicator thresholds 408 and 409 correspond to indicator threshold values of −40 dB and −20 dB, respectively. In another example, the noise indicator 402 indicates a simplified interface without dB values. In this case and as shown in FIG. 4, the noise indicator interface 400 includes two or more sub-ranges indicated by user-friendly text, such as below the indicator threshold 408 ("Quiet"), between the indicator thresholds 408 and 409 ("Noisy"), and above the indicator threshold 409 ("Loud").

The continuation indicator 404 in one example is a user interface button ("Continue"), menu item, or other user interface component. The mobile device 100 initially disables the continuation indicator 404 when the noise indicator interface 400 is displayed to prevent the user from proceeding back to the voice training mode. For example, the mobile device 100 displays the continuation indicator 404 as a "greyed out" or inactive interface component, as shown in views 410, 420, and 430. As described above, the mobile device 100 updates the noise indicator 402 with the current background noise level. When the current background noise level for the received (316) audio input signal meets the indicator threshold value (e.g., the indicator threshold value 408), the mobile device 100 enables the continuation indicator 404 (as shown in view 440), and thus allowing the user to proceed by providing a continuation input that corresponds to the continuation indicator 404.

While two indicator thresholds 408 and 409 are shown, the mobile device 100 in the present embodiment uses one indicator threshold and its corresponding indicator threshold value for the determination (320) on whether to enable the continuation indicator 404. The mobile device 100 may use the same or different indicator threshold values for Steps 310 and 320. The indicator threshold values may be predetermined or selected based on the sample background noise type.

Figure 4A:
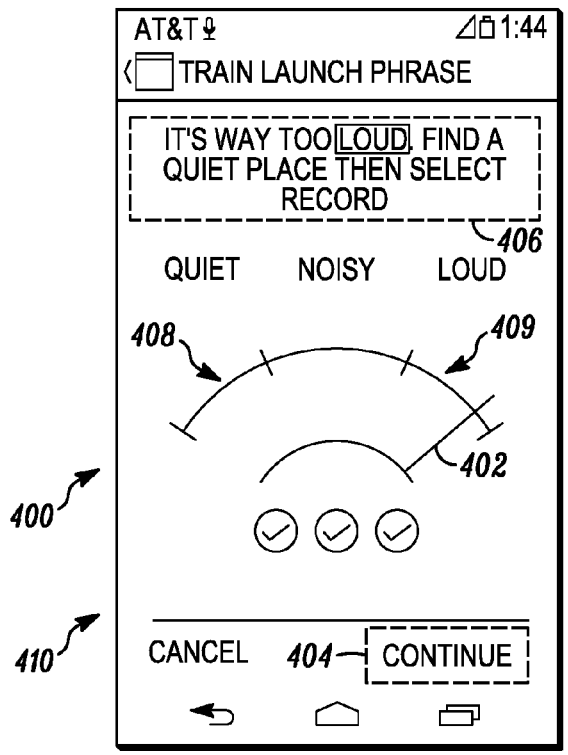
FIGS. 4A, 4B, 4C, and 4D illustrate planar views of one example of a user interface of the mobile device of FIG. 1 for the process flow of FIG. 3.
Figure 4B:
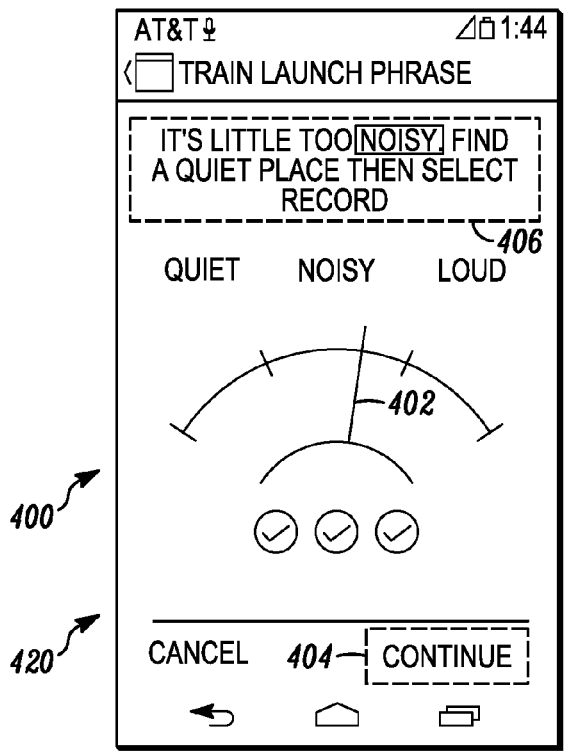
Figure 4C:
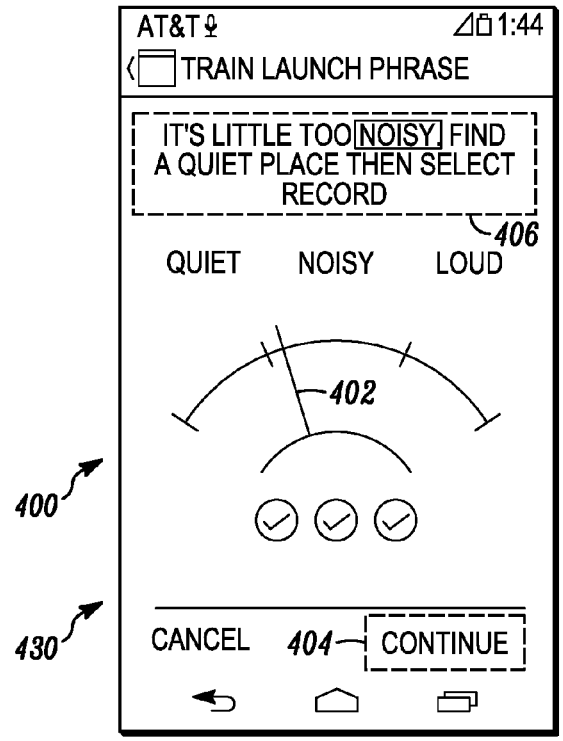
Figure 4D:
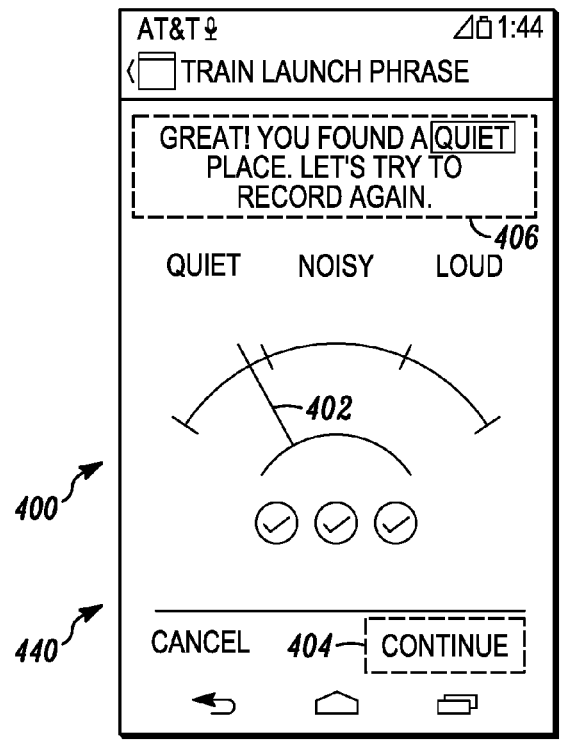

The information display 406 in one example provides information about the noise indicator mode. For example, the information display 406 provides an indication of what the use should do in order for the mobile device 100 to enable the continuation indicator 404. As shown in FIG. 4, the information display 406 provides additional text to supplement the noise indicator 402. In alternative implementations, the information display 406 includes images or graphics that indicate a desirable quiet environment. As shown in FIG. 4A, the noise indicator 402 and information display 406 indicate that the current background noise level is "too loud" and that the user should "Find a quiet place" in order to record. As shown in FIGS. 4B and 4C, as the user moves to a new (e.g., more quiet) environment, the mobile device 100 updates the noise indicator 402 and the information display 406 to indicate that it is still "noisy." As shown in FIG. 4D, when the user has located a sufficiently quiet area, the noise indicator 402 falls into the "quiet" range and the mobile device 100 enables the continuation indicator 404.

Based on the above description, if the background noise rises above the indicator threshold value during the training, the user interface will begin to display a new screen that indicates that the ambient or background noise is too high to continue, and that the user must move to a quieter location in order to continue. This user interface will continue to display until the user exits the training, or until the user clicks 'continue'. The 'continue' button is not clickable until the volume level once again returns to below the threshold that had resulted in the UI appearing in the first place.

It can be seen from the foregoing that a method and system for voice recognition training have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A computer-implemented method comprising:
providing, by a mobile computing device, a first user interface indicating that (i) a voice training mode is active, and (ii) a voice training sample is to be spoken by a user;
before the voice training sample is spoken by the user, automatically providing, by the mobile computing device, a second user interface indicating that (i) a background noise indicator mode is active, and (ii) a background noise loudness satisfies a loudness threshold or a background noise variance satisfies a variance threshold; and
upon determining that the background noise loudness no longer satisfies the loudness threshold and the background noise variance no longer satisfies the variance threshold, enabling, by the mobile computing device, a selectable control that is configured to, upon selection by the user, provide the first user interface.

2. The method of claim 1, wherein the second user interface includes a dial-type interface and a needle that indicates a level of the background noise.

3. The method of claim 1, wherein the second user interface does not indicate that (i) the voice training mode is active, and (ii) the voice training sample is to be spoken by the user.

4. The method of claim 1, wherein the first user interface does not indicate that (i) the background noise indicator mode is active, and (ii) the background noise loudness satisfies the loudness threshold or the background noise variance satisfies the variance threshold.

5. The method of claim 1, wherein the background noise loudness satisfies the loudness threshold based on the background loudness being greater than the loudness threshold.

6. The method of claim 5, wherein the loudness threshold is based on the background noise variance.

7. A system comprising:
one or more computers and one or more storage devices storing instructions that are operable, when executed by the one or more computers, to cause the one or more computers to perform operations comprising:
providing, by a mobile computing device, a first user interface indicating that (i) a voice training mode is active, and (ii) a voice training sample is to be spoken by a user;
before the voice training sample is spoken by the user, automatically providing, by the mobile computing device, a second user interface indicating that (i) a background noise indicator mode is active, and (ii) a background noise loudness satisfies a loudness threshold or a background noise variance satisfies a variance threshold; and
upon determining that the background noise loudness no longer satisfies the loudness threshold and the background noise variance no longer satisfies the variance threshold, enabling, by the mobile computing device, a selectable control that is configured to, upon selection by the user, provide the first user interface.

8. The system of claim 7, wherein the second user interface includes a dial-type interface and a needle that indicates a level of the background noise.

9. The system of claim 7, wherein the second user interface does not indicate that (i) the voice training mode is active, and (ii) the voice training sample is to be spoken by the user.

10. The system of claim 7, wherein the first user interface does not indicate that (i) the background noise indicator mode is active, and (ii) the background noise loudness satisfies the loudness threshold or the background noise variance satisfies the variance threshold.

11. The system of claim 7, wherein the background noise loudness satisfies the loudness threshold based on the background loudness being greater than the loudness threshold.

12. The system of claim 11, wherein the loudness threshold is based on the background noise variance.

13. A non-transitory computer-readable medium storing software comprising instructions executable by one or more computers which, upon such execution, cause the one or more computers to perform operations comprising:
providing, by a mobile computing device, a first user interface indicating that (i) a voice training mode is active, and (ii) a voice training sample is to be spoken by a user;
before the voice training sample is spoken by the user, automatically providing, by the mobile computing device, a second user interface indicating that (i) a background noise indicator mode is active, and (ii) a background noise loudness satisfies a loudness threshold and the background noise variance satisfies a variance threshold; and
upon determining that the background noise loudness no longer satisfies the loudness threshold or the background noise variance no longer satisfies the variance threshold, enabling, by the mobile computing device, a selectable control that is configured to, upon selection by the user, provide the first user interface.

14. The medium of claim 13, wherein the second user interface includes a dial-type interface and a needle that indicates a level of the background noise.

15. The medium of claim 13, wherein the second user interface does not indicate that (i) the voice training mode is active, and (ii) the voice training sample is to be spoken by the user.

16. The medium of claim 13, wherein the first user interface does not indicate that (i) the background noise indicator mode is active, and (ii) the background noise loudness satisfies the loudness threshold or the background noise variance satisfies the variance threshold.

17. The medium of claim 13, wherein the background noise loudness satisfies the loudness threshold based on the background loudness being greater than the loudness threshold.

18. The medium of claim 17, wherein the loudness threshold is based on the background noise variance.

* * * * *